United States Patent [19]

Kinloch et al.

[11] Patent Number: 4,946,907

[45] Date of Patent: Aug. 7, 1990

[54] CURABLE THERMOSETTING PREPOLYMERIZED IMIDE RESIN COMPOSITIONS

[75] Inventors: Anthony J. Kinloch, Bishops Stortford; Stephen J. Shaw, Saffron Walden, both of England

[73] Assignee: The Secretary of State for Defense in Her Britannic Majesty's Government of the United Kingdom of Great Britain and Northern Ireland, London, England

[21] Appl. No.: 106,998

[22] Filed: Oct. 5, 1987

Related U.S. Application Data

[63] Continuation of Ser. No. 645,311, filed as PCT GB83/00350 on Dec. 23, 1983, published as WO84/02528 on Jul. 5, 1984, abandoned.

[30] Foreign Application Priority Data

Dec. 24, 1982 [GB] United Kingdom ............... 8236849

[51] Int. Cl.$^5$ ..................... C08L 79/08; C08F 22/40
[52] U.S. Cl. .................... 525/422; 525/181; 525/184; 525/426; 526/262
[58] Field of Search ............. 526/262; 525/422, 426, 525/181, 184

[56] References Cited

U.S. PATENT DOCUMENTS

| | | | |
|---|---|---|---|
| 2,989,504 | 6/1961 | Little | 526/262 |
| 3,562,223 | 2/1971 | Bargain et al. | 528/322 |
| 4,211,860 | 7/1980 | Stenzenberger | 528/322 |
| 4,211,861 | 7/1980 | Stenzenberger | 528/310 |
| 4,216,297 | 8/1980 | Vaughan et al. | 525/282 |
| 4,229,550 | 10/1980 | Jones et al. | 525/282 |
| 4,468,497 | 8/1984 | Street et al. | 525/422 |
| 4,497,935 | 2/1985 | St. Clair | 525/184 |
| 4,654,407 | 3/1987 | Domeier | 526/262 |

FOREIGN PATENT DOCUMENTS

| | | | |
|---|---|---|---|
| 57-57732 | 4/1982 | Japan | 525/184 |
| 57-105479 | 6/1982 | Japan | 525/184 |

Primary Examiner—Ana L. Carrillo
Attorney, Agent, or Firm—Nixon & Vanderhye

[57] ABSTRACT

A curable thermosetting prepolymerized imide resin composition is prepared by chemically reacting, at a temperature below 150° C., a liquid mixture of a carboxy-terminated polybutadiene/acrylonitrile (CTBN) and a co-reactant containing at least one N,N'-bisimide of an unsaturated carboxylic acid of general formula (I)

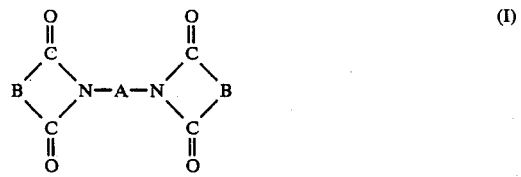

where B represents a divalent radical containing a carbon-carbon double bond and A represents a divalent radical having at least two carbon atoms, at least one monoimide, and at least one organic hydrazide, to yield a curable thermosetting prepolymerized imide resin composition containing copolymerized CTBN and co-reactant. A resin composition prepared by this method may be cured at a temperature between 100° C. and 350° C. to yield a fully cross-linked polymimide matrix containing a dispersion of phase-separated solid particles of copolymerized CTBN and co-reagent, said matrix having a lap shear strength at 20° C. at least 50% greater than that of a fully cross-linked polyimide cured from the co-reactant alone.

8 Claims, No Drawings

CURABLE THERMOSETTING PREPOLYMERIZED IMIDE RESIN COMPOSITIONS

This application is a continuation, of application Ser. No. 645,311, filed as PCT GB83/00350 on Dec. 23, 1983, published as WO84/02528 on Jul. 5, 1984, now abandoned.

This invention relates to thermosetting imide resin compositions containing elastomers, to methods of preparing these compositions, and to elastomer-toughened polyimides cured from these compositions. In particular but not exclusively, this invention is concerned with the elastomer-toughening of addition-type polyimides which are produced from the polymerisation and cross-linking of bismaleimide prepolymers.

Thermoset polyimides are organic polymers which in general have very high thermal and oxidative stabilities. They are used in a number of industrial applications, especially as adhesives and structural composites. Most polyimides fall within the category of addition-type or condensation-type polymides according to the type of polymerization reaction which produces them from their prepolymer constituent or constituents. Condensation-type polyimides are generally produced from dianhydrides and diamines via the formation of a soluble polyamic acid precursor. The formation of the polyimide from the polyamic acid is known as cyclodehydration and entails the liberation of water which, under the reaction conditions, is liberated as a vapour which can create voids in the polymer. Addition-type polyimide prepolymers are cured by an addition reaction which overcomes the problem caused by volatile evolution of water, and thus addition-type polyimides possess a significant advantage over condensation type polyimides.

One disadvantage of addition-type polyimides however is that they depend to a large degree on a highly crosslinked structure for high temperature capabilities, which structure can result in brittle behaviour. Some of the more brittle addition-type polyimides have been toughened by the chain extension of the imide prepolymer molecules, which has resulted in the polyimides cured therefrom having more open flexible molecular structures than their unmodified, brittle counterparts. However, this increase in toughness has usually been found to be offset by a major reduction in other desirable properties of the polyimides, such as glass transition temperature, thermal stability and mechanical strength, because chain extension of the prepolymer reduces the density of inter-molecular cross-links in the polyimide structure.

Attempts have been made to improve the toughness of addition-type polyimides by the addition of elastomers. St Clair et al (Int J Adhesion, Jul. 1981 page 249) reported an up to 5 fold increase in the toughness (in terms of increased fracture energy) of an addition-type polyimide prepared from a bisimide prepolymer having nadic end groups, by the addition of either aromatic amine-terminated butadiene/acrylonitrile (AATBN) or aromatic amine-terminated silicone (AATS) to the prepolymer. However, one disadvantage of using either of these two elastomers is that they do not appear suitable for toughening some other types of addition-type polyimides. Gollob et al (Massachusetts Institute of Technology School of Engineering Research Report R79-1, August 1979) reported that the toughness of a bismaleimide-type polyimide was little changed by the addition of either of these two elastomers to the bismaleimide prepolymer prior to curing.

It is one object of the present invention to provide a novel method for preparing an elastomer-toughened polyimide whereby the above disadvantage is overcome or at least mitigated in part.

According to the present invention there is provided a method for preparing a curable thermosetting prepolymerised imide resin composition which comprises chemically reacting, at a temperature below 150° C., a liquid mixture of a carboxy-terminated polybutadiene-acrylonitrile (CTBN) and a co-reactant comprising a. at least one N,N'-bisimide of an unsaturated carboxylic acid of general formula I

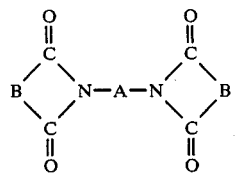

wherein B represents a divalent radical containing a carbon-carbon double bond and A represents a divalent radical having at least two carbon atoms, or b. the imide resin reaction product of at least one N,N'-bisimide of general fromula I and at least one primary organic diamine or organic hydrazide, or c. the imide resin reaction product of at least one N,N'bisimide of general formula I, at least one monoimide, and at least one organic hydrazide, to yield a curable thermosetting prepolymerised imide resin composition containing copolymerised CTBN and co-reactant, said composition being curable at a temperature between 100° C. and 350° to a fully crosslinked polyimide matrix containing a dispersion of phase-separated solid particles of copolymerised CTBN and co-reactant, said matrix having a lap shear strength at 20° at least 50% greater than that of a fully crosslinked polyimide cured from the co-reactant alone.

Polyimides cured from the thermosetting imide resin compositions prepared in accordance with the method of the present invention are found to possess as much as six times the toughness in terms of increased lap shear strength, or fourteen times the toughness in terms of increased fracture energy, of polyimides cured from the corresponding imide resin-containing co-reactant alone. Furthermore, these novel elastomer-toughened polyimides are also invariable stronger and have the same or even a higher glass transition temperature at the expense of only a moderately small decrease in decomposition temperature. The optimum concentration of CTBN in the imide resin composition which produces polyimides having considerable improvements in toughness without a significant reduction in glass transition temperature, decomposition temperature, and flexural modulus, lies in the range 10 to 50 parts by weight of CTBN per 100 parts of co-reactant.

It is essential to the method of the present invention that the co-reactant be fully molten below 150° C., preferably below 135° C., so that it can be intimately mixed with the CTBN and so that the co-reactant. remains in an ungelled state for a sufficient length of time to allow the CTBN to copolymerise with the co-reactant and form phase-separated particles in the reaction mixture within that time.

In the at least one bisimide of general formula I, the group B is preferably selected from

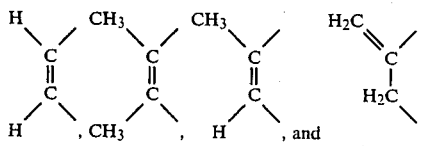

and most preferably the at least one bisimide comprises at least one of the following bisimides:
1,2-bismaleimido ethane,
1,4-bismaleimido butane,
1,6-bismaleimido hexane,
1,12-bismaleimido dodecane,
1,6-bismaleimido-(2,2,4-trimethyl)hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconic acid imide,
N,N'-4,4'-diphenylmethane citraconimide, and
N,N'-4,4'-diphenylmethane bisitaconimide.

The co-reactant may comprise the reaction product of the at least one bisimide of general formula I and at least one primary organic diamine of general formula II

wherein D represents a divalent radical having not more than 30 carbon atoms, provided that the ratio of the total number of moles of bisimide of general formula I to the total number of moles of diamine of general formula II in the reaction mixture lies in the range 1.2:1 to 50:1. Examples of diamines of general formula II which may be employed, are 4,4'-diaminodicyclohexylmethane, 1,4-diaminocyclohexane, 2,6-diaminopyridine, metaphenylene-diamine, paraphenylenediamine, 4,4'-diaminodiphenyl-methane, 2,2-bis(4-aminophenyl)-propane, benzidine, 4,4'-diaminophenyl oxide, 4,4'-diaminodiphenyl sulphide, 4,4'-diaminodiphenylsulphone, bis-(4-aminophenyl)di-phenylsilane, bis-(4-aminophenyl)methylphosphine oxide, bis-(3-aminophenyl)methylphosphine oxide, bis-(4-amino-phenyl) phenylphosphine oxide, bis-(4-aminophenyl) phenylamine, 1,5-diaminonaphthanlene, metaxylylenediamine, paraxylylene diamine, 1,1-bis(paraaminophenyl)phthalene, and hexamethylenediamine.

Alternatively, the co-reactant may comprise the reaction product of the at least one bisimide of general formula I and at least one organic hydrazide of general formula III

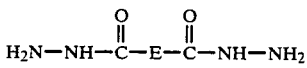

wherein E represents a divalent organic group, provided that the ratio of the total number of moles of bisimide of general formula I to the total number of moles of hydrazide of general formula III in the reaction mixture lies in the range of 1.1:1 to 10:1. Examples of hydrazides of general formula III which may be employed include
Oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic acid dihydrazide,
terephthalic acid dihydrazide,
isophthalic acid dihydrazide,
2,6-naphthalene dicarboxylic acid dihydrazide, and
2,7-naphthalene dicarboxylic acid dihydrazide,.

The co-reactant may also comprise the reaction product of the at least one bisimide of general formula I and at least one organic hydrazide of general formula IV

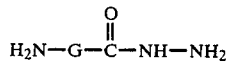

wherein G represents a divalent organic group, provided that the total number of moles of bisimide of general formula I to the total number of moles of hydrazide of general formula IV lies in the range 1.1:1 to 10:1. Examples of hydrazides of general formula IV which may be employed include
Amino acetic acid hydrazide,
alanine hydrazide,
leucine hydrazide,
isoleucine hydrazide,
phenyl alanine hydrazide,
valine hydrazide,
β-alanine hydrazide,
γ-amino butyric acid hydrazide,
αamino butyric acid hydrazide,
ε-amino caproic acid hydrazide,
amino valeric acid hydrazide,
and other aliphatic amino acid hydrazides.

Aromatic amino acid hydrazides such as
p-amino benzoic acid hydrazide,
p-amino benzoic acid hydrazide,
m-amino benzoic acid hydrazide,
anthranilic acid hydrazide, may also be used.

As a yet further alternative, the co-reactant may comprise the reaction product of the at least one bisimide of general formula I, at least one monoimide of general formula V

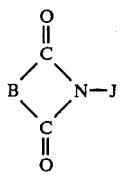

where B represents a divalent radical containing a carbon-carbon double bond and J represents an alkyl, cycloalkyl or aryl group, and at least one organic hydrazide of general formula III

wherein E represents a divalent organic group. Examples of hydrazides of general formula III which may be employed include
Oxalic acid dihydrazide,
malonic acid dihydrazide,
succinic acid dihydrazide,
glutaric acid dihydrazide,
adipic acid dihydrazide,
pimelic acid dihydrazide,
suberic acid dihydrazide,
sebacic acid dihydrazide,
cyclohexane dicarboxylic acid dihydrazide,
terephathalic acid dihydrazide,
isophthalic acid dihydrazide,
2,6-naphthalene dicarboxylic acid dihydrazide, and
2,7-naphthalene dicarboxylic acid dihydrazide.
Examples of monoimides of general formula V which may be employed include
N-methylmaleimide,
N-ethylmaleimide,
N-propylmaleimide,
N-dodecylmaleimide,
N-isobutylmaleimide,
N-isopropylmaleimide,
N-phenylmaleimide,
N-phenylcitroconimide,
N-phenylitaconimide,
N-toluylmaleimide,
N-mono-chlorophenylmaleimide,
N-biphenylmaleimide,
N-naphthylmaleimide,
N-vinylmaleimide,
N-allylmaleimide, and
N-cyclohexylmaleimide.

Where the co-reactant comprises the imide resin reaction product of either
i. the at least one bisimide of general formula I and at least one primary organic diamine or organic hydrazide, or
ii. the at least one bisimide of general formula I, at least one monoimide, and at least one organic hydrazide,
then conveniently the co-reactant may also comprise, at least in part, a portion of the reagents of this reaction product, particular if the effect the presence of these reagents is to reduce the melting point and melt viscosity of the co-reactant and thereby render it more suitable for use in the method of the present invention. It is one advantage of the method of the present invention that when the co-reactant comprises a mixture of said reagents and reaction product, then this mixture after having been copolymerised need not necessarily be cured with the CTBN at a pressure in excess of atmospheric pressure in order to suppress the formation of gas bubbles in the fully crosslinked polyimide.

It is essential that the CTBN elastomer be fully molten below 150° C., preferably below 120° C., so that it can be intimately mixed with the imide resin co-reactant to allow copolymerisation to take place. It is also essential that the CTBN is sufficiently compatible with the co-reactant for it to be at least partially mixable with the co-reactant such that copolymerisation can be substantially completed before the co-reactant reaches its gel point, although it is not essential that the CTBN and co-reactant be soluble in one another. The degree of compatibility is found to increase with increasing content of polar groups, i.e. acrylonitrile groups, in the CTBN. However, it is also essential for the copolymer produced to be sufficiently incompatiable with the co-reactant such that it will form into phase separated particles within the mixture before the co-reagent reaches its gel point. This copolymer incompatibility is found to decrease with increasing acrylonitrile content, and so a comprise has to be found in terms of CTBN acrylonitrile content. Preferably, therefore, the CTBN is of general formula VI

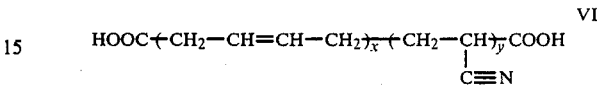

wherein the ratio of x to y lies in the range 99:1 to 65:35.

In general, the lower the molecular weight of the carboxy-terminated elastomer, the lower its viscosity at a given temperature will be and the more likely it will mix with the molten resin. However, although the molecular weight of the carboxy-terminated elastomer is important in determining its fluid properties and hence its ability to mix with the resin, it also has other important effects on the reaction with the resin. The use of an elastomer of low molecular weight also enables a very large number of copolymerisation reactions to take place in the resin/elastomer mixture before phase separation of the imide copolymer takes place. This in turn facilitates the production of a highly toughened polyimide which better retains the thermal and oxidative properties of the polyimide per se than if an elastomer of higher molecular weight were used. However, an undersirable effect of decreasing the molecular weight of the elastomer is that the time taken to achieve phase separation of the imide copolymer is generally increased, and this in turn increases the possibility of the resin matrix reaching its gel point before phase separation occurs. It is therefore important to select a carboxy-terminated elastomer having a molecular weight which is generally as low as possible whilst still enabling phase separation of copolymer particles to take place before the resin matrix gels. Preferably, the molecular weight of the CTBN elastomer lies in the range 1,000–10,000.

A number of analytical techniques may be used to demonstrate that, in the reaction mixture comprising the CTBN and the reactant, copolymerisation followed by phase separation has taken place. Phase separation must take place before the co-reactant gels, because after that point the copolymer produced cannot migrate into particles, a fact well established in the art of toughening thermoset polymers by the addition of elastomers. Firstly the rate of reduction of imide groups may be detected in a copolymerising mixture of the CTBN and the co-reactant, and, if greater than the rate of reduction of imide groups in the co-reactant left to stand by itself at the same temperature, this indicates that copolymerisation as well as homopolymerisation is taking place in the reaction mixture. For example, the concentration of imide groups may be measured in each sample using infra-red absorption techniques; any reduction in concentration will register as a reduction in one or more absorbed wavelengths unique to those imides present in the mixture.

Scanning Electron Microscopy (SEM) may be used on the fractured faces of portions of the sample, once cured, to detect the presence of solid phase separated particles therein. In detecting the presence of particles in the cured sample, SEM confirms that two solid phases exist in the sample and, since carboxy-terminated elastomers are not known to undergo homopolymerisation, that one of the solid phases must therefore comprise a copolymer of the resin and the elastomer. Furthermore, it may be demonstrated by SEM that the volume fraction of the particles (in cured samples of toughened polyimides in accordance with the present invention) decreases with decreasing sample elastomer content, proving that the particle phase in the sample comprises or contains the resin elastomer copolymer. The term "phase separation" as used in this specification includes the average diameter of the particles which form in the mixture of the resin and elastomer is preferably between 0.1 and 10 microns, most preferably 0.5 and 8 microns.

The volume fraction of the phase separated particles in the polyimide is preferably equal to or greater than the volume fraction of CTBN in the liquid reaction mixture prior to copolymerisation.

The present invention further provides a method for preparing a fully crosslinked polymer matrix containing a dispersion of phase-separated solid particles of copolymerised CTBN and co-reactant, said matrix having a lap shear strength at 20° C. at least 50% greater than that of a fully crosslinked polyimide cured from the co-reactant alone, which comprise the further step of heating the prepolymerised resin composition to a temperatuure between 100° C. and 350° C.

Methods of preparing curable thermosetting prepolymerised imide resin compositions and of preparing polyimides cured therefrom will now be described by way of example only.

In Examples 1 to 8 inclusive, the imide resin co-reactant used was H353, which consists of a near-eutectic blend of three bismaleimide resins comprising 44,4'-bismaleimido diphenyl methane, 2,4-bismaleimido-toluene, and 1,6-bismaleimido-(2,2,4-trimethyl)hexane. H353 is marketed by Technochemie GmbH of West Germany. The H353 blend melts in the range 70° C. to 100° C., and is usually cured in the range 170° C. to 240° C., though the minimum temperature at which it will gel over a long period of time is about 120° C. to 135° C. In Examples 10 to 13 inclusive, the imide resin co-reactant used was H795, also marketed by Tecnochemie GmbH, which consists of a mixture of an N,N'-bisimide, a hydrazide of an amino acid, and the imide resin reaction product thereof patented under U.S. Pat. No. 4211861. H795 has a melting point of about 110° C. and is usually cured at about 210° C.

The CTBN's used in the Examples were all Hycar (Trade Mark) elastomers marketed by the BF Goodrich Company, U.S.A. These CTBN elastomers were all liquids at room temperature and had a molecular weight of about 3000 and a functionality of about 1.8. Hycar 1300 ×8 had an acrylonitrile content of about 17% by weight, Hycar 1300×13 had an acrylonitrile content of about 10% by weight, and Hycar 1300×31 had an acrylonitrile content of about 26% by weight.

The following physical property tests were conducted on samples of fully crosslinked polyimides prepared in accordance with the methods described in the Examples. Sample toughness was measured at 20° C. in terms of fracture energy ($G_{IC}$) in $Jm^{-2}$ as determined by ASTM Standard Method E399 1972 using samples prepared in a compact tension specimen geometry, and in terms of lap shear strength in MPa as determined by British Standard Specification 5350 Part C5 "Method of Tests for Adhesives". Increasing fracture energy and/or lap shear strength indicates an increase in toughness. The flexural strength at failure and flexural modulus of elasticity of the samples was determined at room temperature (20° C.) by ASTM Standard Method D790-1971. The glass transition temperature (Tg) was determined by thermomechanical analysis using a Stanton-Redcroft Thermomechanical Analyser. Tg indicated the temperature at which a transition from hard elastic to soft rubbery or leather characteristics occurred in the samples with increasing temperature. The decomposition temperature (Td) of the samples was determined by thermogravimetric analysis on the samples in an atmosphere of either air or nitrogen, where the weight loss experienced by a sample was constantly monitored while sample temperature was raised at a prescribed rate. The temperature at which a 10% weight loss occurred was recorded. The average particle size of the phase separated solid particles formed within a sample was determined by first analysing the phase separated particles within a fractured face of the sample by Scanning Electron Microscopy (SEM), followed by estimating average particle size and optionally volume fraction of particles within the sample, by subjecting the analysis results to Spector's Method.

EXAMPLE 1

H353 resin was heated to 120° C. until it became a low viscosity liquid. To 100 parts of this molten resin was added 10 parts by weight of liquid Hycar 1300×8 elastomer also at 120° C. The resin and elastomer were then thoroughly mixed, and the temperature of the mixture was maintained at 120° C. for 24 hours, with occasional further mixing, to enable the elastomer to copolymerise with the resin. A reaction period of 24 hours was chosen because it was known that at 120° C. H353 resin required at least this period of time before reaching its gel point. The resin and elastomer were found not to be entirely compatible with one another at this temperature, and so the further mixing was important to ensure that intimate intermolecular contact between the resin and the elastomer was maintained throughout the 24 hour period, by breaking up the separate layers of resin and elastomer which formed with time. The periods of time between mixing were used to observe the gradual reduction in size of the elastomer layer as copolymerisation progressed. This elastomer layer which formed on top of the resin was found to disappear altogether after about 24 hours, at which stage the copolymerisation reaction was taken to be virtually complete.

During the 24 hour period, small samples of the mixture were periodically withdrawn, solidified by cooling, ground to powder, and subjected to Infrared Spectroscopy using potassium bromide discs. Using this technique, the rate of reduction of imide groups in the mixture was followed by measuring the reduction in the i.r. peak at 3100 $cm^{-1}$ ($\lambda$=3.23 microns). A greater than expected rate of imide group consumption was a further indication that the resin was copolymerising as well as homopolymerising. After the completion of the copolymerisation stage, the product was degassed at 120° C. to remove air entrained during mixing. The product was then gelled and cured to a fully crosslinked polyimide by first heating to 170° C. for two hours and then to 210° C. for a further five hours. The product was then brought back to room temperature by slowly cooling so as to prevent cracking. Fractured samples of the cured, cooled samples were subjected to SEM to reveal the presence of phase separated solid particles in the polyimide. The particles were found to have an average size of about 5 microns.

EXAMPLE 2 TO 6 INCLUSIVE

The method of Example 1 was repeated in 5 further Examples, each using a different concentration of Hycar 1300×8 CTBN in the resin/elastomer reaction mixture to that used in Example 1. The CTBN concentrations used were: Example 2—30 phr, Example 3—50 phr, Example 4—100 phr, Example 5—150 phr, and Example 6—200 phr. The term "phr" means part by weight of CTBN per 100 parts by weight of H353 resin. In each Example, SEM analysis conducted on samples of the fully crosslinked polyimide product revealed the presence of phase separated solid particles of average size between 0.5 and 8 microns.

Samples of polyimide prepared in accordance with the methods of Examples 1 to 6 inclusive were subjected to the physical property tests described above. The results of these tests are given in Table 1 below where the properties are compared with those of samples of a Control Example prepared by fully crosslinking H353 alone using the same curing procedure as employed in Example 1.

revealed the presence of phase separated particles of average particle size between 0.5 and 8 microns, and the lap shear strength of a further sample of this polyimide was measured at nearly six times that of corresponding sample of the polyimide cured from H353 alone (the Control Example of Table 1 above).

EXAMPLE 8

To 100 parts by weight of 1,12 bismaleimido dodecane resin (mp 110° C.–120° C.) was admixed 30 parts by weight of Hycar 1300×31 elastomer at a temperature of 130° C. The resin had to be heated to at least 130° C. because below this temperature it was found to be too viscous to facilitate mixing with the elastomer. The mixture was maintained for 8 hours with occasional further mixing to effect copolymerisation between the resin and the elastomer. A period of 8 hours was chosen because it was known that at 130° C. the resin gelled after about 10 hours.

The imide resin product of the reaction was then cured to a fully crosslinked polyimide by heating to 170° C. for 2 hours and then 210° C. for a further 5 hours. SEM analysis conducted on fractured samples of the cooled polyimide product revealed the presence of phase separated particles of average particle size between 0.5 and 8 microns, and the lap shear strength of a further sample of this polyimide was found to be at least 50% greater than that of a corresponding sample of polyimide cured from 1, 12 bismaleimido-dodecane alone using the same curing procedure.

TABLE 1

|  | Control Example | Example 1 | Example 2 | Example 3 | Example 4 | Example 5 | Example 6 |
|---|---|---|---|---|---|---|---|
| CTBN (phr)* | 0 | 10 | 30 | 50 | 100 | 150 | 200 |
| Fracture Energy $G_{IC}$ ($Jm^{-2}$ @ 20° C.) | 11 | 45 | 140 ± 20 | 140 ± 60 | 470 ± 80 | | |
| Flexural Strength (MPa) | 24 | 37 | 68 ± 8 | 63 ± 20 | 70 ± 10 | >70 | >70 |
| Glass Transition Temperature Tg (°C.) | 257 | 299 | 299 | 295 | 295 | | |
| Decomposition Temperature Td (°C., 10% wt loss) | | | | | | | |
| in air | 562 | 530 | 508 | 516 | 481 | | |
| in $N_2$ | 565 | 557 | 519 | 514 | 500 | | |
| Flexural Modulus of Elasticity (GPa @ 20° C.) | 4.3 | 4.55 | 3.6 | 3.3 | 2.32 | 1.3 | 0.3 |
| Lap Shear Strength (MPa at 20° C.) | 4.05 | 8.0 | 18.45 | 24.86 | 26.22 | | |

*parts by weight of CTBN per 100 parts by weight of H353 resin

From the results given in Table 1, it may be seen that polyimides cured from mixtures of H353 resin and Hycar 1300×8 CTBN prepared in accordance with the present invention undergo, with increasing CTBN content, a marked increase in toughness together with a modest increase in flexural strength and glass transition temperature, up to a CTBN content of 100 phr at least. The thermal stability of these toughened polyimides as measuured by $T_D$ is not unduly reduced in comparison with the untoughened Control Example; however, a steady decline in flexural modulus is observed with increase CTBN content above a CTBN concentration of 30 phr.

EXAMPLE 7

The method of Example 1 was repeated using 30 phr Hycar 1300×13 elastomer rather than 10 phr of Hycar 1300×8 elastomer. SEM analysis conducted on fractured samples of the fully crosslinked polyimide prepared in accordance with the method of Example 7

EXAMPLE 9 (comparative)

To 100 parts by weight of 4,4'bismaleimido diphenyl methanne (mp 155°–180° C.) was admixed 30 parts by weight of Hycar 1300×8 elastomer at a temperature of 180° C. The bisimide resin had to be heated to 180° C. because below this temperature the elastomer could not easily be mixed in with it due to the resin's high viscosity. Once mixed with the elastomer, however, the mixture gelled within 20 minutes. The mixture was then further cured to a fully crosslinked polyimide, and SEM analysis conducted on samples of the polyimide revealed the absence of any detectable phase separated particles, indicating that phase separation had not taken place.

EXAMPLE 10

The method of Example 1 was repeated using H795 resin rather than H353 resin.

EXAMPLES 11 TO 13

The method of Example 10 was repeated in three further Examples, each using a different concentration of Hycar 1300×8 CTBN in the resin/elastomer reaction mixture to that used in Exammple 10. The CTBN concentrations used were: Example 11—30 phr, Example 12—50 phr, and Example 13—100 phr, where "phr" means parts by weight of CTBN per 100 parts by weight of H795.

Samples of polyimide prepared in accordance with the methods of Examples 10 to 13 inclusive were tested to measure toughness and to detect the presence of phase separated particles. In samples prepared in accordance with each of these Examples, phase separated solid particles size between 0.1 and 10 microns were detected by SEM analysis. The lap shear strength of a sample of polyimide prepared in accordance with the method of each of these Examples was found in all cases to be more than 50% greater than that of a sample of polyimide cured by the same curing sequence from H795 resin alone. The sample of H795 resin was, however, required to be cured under pressure to prevent the formation of gas bubbles in the polyimide, whereas those of the polyimides prepared by the methods of Examples 10 to 13 inclusive were cured at atmospheric pressure without gas bubbles being detected in the polyimide matrix when curing was complete.

We claim:

1. A method for preparing a curable thermosetting prepolymerised imide resin composition comprising chemically reacting, at a temperature below 150° C., a liquid mixture of a carboxy-terminated polybutadiene/acrylonitrile (CTBN) and a co-reactant comprising
   a. at least one N,N'-bisimide of an unsaturated carboxylic acid of general formula I

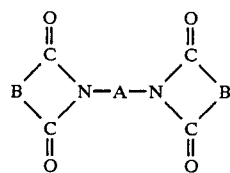

wherein B represents a divalent radical containing a carbon-carbon double bond and A represents a divalent radical having at least two carbon atoms, or
   b. the imide resin reaction product of at least one N,N'-bisimide of general formula I and at least one primary organic diamine or organic hydrazide, or
   c. the imide resin reaction product of at least one N,N'-bisimide of general formula I, at least one monoimide, and at least one organic hydrazide, to yield a curable thermosetting propolymerised imide resin composition containing copolymerised CTBN and co-reactant, said composition being curable at a temperature between 100° C. and 350° C. to a fully cross-linked polyimide matrix containing a dispersion of phase separated solid particles of copolymerised CTBN and co-reactant, said matrix having a lap shear strength at 20° C. greater than that of a fully cross-linked polyimide cured from the co-reactant alone.

2. A method according to claim 1, wherein the average particle size of the phase separated particles, as determined by Scaning Electron Microscopy, lies in the range 0.1 to 10 microns, preferably 0.5 to 8 microns.

3. A method according to claim 1, wherein B is selected from the group consisting of:

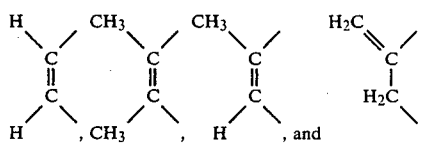

4. A method according to claim 1, wherein the at least one bisimide of general formula I is selected from the group consisting of:
1,2-bismaleimido ethane,
1,4-bismaleimido butane,
1,6-bismaleimido hexane,
1,12-bismaleimido dodecane,
1,6-bismaleimido-(2,2,4-trimethyl)hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconic acid imide,
N,N'-4,4'-diphenylmethane citraconimide/and
N,N'-4,4'-diphenylmethane bisitaconimide.

5. A method according to claim 1 wherein the CTBN is of general formula VI

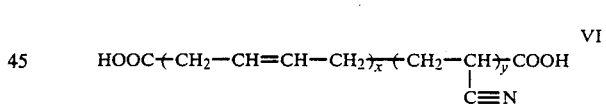

wherein the ratio of x to y lies in the range 99:1 to 65:35.

6. A curable thermosetting prepolymeised imide resin composition whenever prepared by the method of claim 1.

7. A method according to claim 1 which further comprises the subsequent step of heating the prepolymerised resin composition to a temperature betweeen 100° C. and 350° C. to yield a fully cross-linked polymer matrix containing a dispersion of phase-separated solid particles of copolymerised CTBN and co-reactant, said matrix having a lap shear strength at 20° C. greater than that of a fully cross-linked polyimide cured from the co-reactant alone.

8. A fully cross-linked polyimide matrix containing a dispersion of phase-separated solid particles of CTBN and co-reactant whenever prepared by the method of claim 7.

* * * * *